(12) United States Patent
Kong

(10) Patent No.: US 8,419,220 B2
(45) Date of Patent: Apr. 16, 2013

(54) LAMP DEVICE

(75) Inventor: Kyung-il Kong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 12 days.

(21) Appl. No.: 13/446,139

(22) Filed: Apr. 13, 2012

(65) Prior Publication Data

US 2012/0195039 A1 Aug. 2, 2012

Related U.S. Application Data

(63) Continuation of application No. 13/087,623, filed on Apr. 15, 2011, now Pat. No. 8,297,790.

(30) Foreign Application Priority Data

Aug. 18, 2010 (KR) .................. 10-2010-0079810
Sep. 17, 2010 (KR) .................. 10-2010-0091546
Sep. 17, 2010 (KR) .................. 10-2010-0091861

(51) Int. Cl.
*F21V 29/00* (2006.01)
*F21S 4/00* (2006.01)
*G02B 6/04* (2006.01)

(52) U.S. Cl.
USPC ...... 362/249.02; 362/294; 362/373; 362/554; 362/555

(58) Field of Classification Search .................. 362/555, 362/580, 294, 218, 269, 275, 287, 249.02, 362/373, 554
See application file for complete search history.

(56) References Cited

U.S. PATENT DOCUMENTS

| 6,371,628 | B1 | 4/2002 | Ward | |
|---|---|---|---|---|
| 6,832,849 | B2 * | 12/2004 | Yoneda et al. | 362/551 |
| 7,458,706 | B1 | 12/2008 | Liu et al. | |
| 7,563,009 | B2 * | 7/2009 | Valcamp et al. | 362/545 |
| 2005/0140270 | A1 | 6/2005 | Henson et al. | |
| 2007/0019419 | A1 | 1/2007 | Hafuka et al. | |
| 2007/0097702 | A1 | 5/2007 | Crowder | |
| 2009/0257234 | A1 | 10/2009 | Zheng et al. | |
| 2011/0204764 | A1 * | 8/2011 | Kong | 313/46 |

FOREIGN PATENT DOCUMENTS

| EP | 2 206 945 | 7/2010 |
|---|---|---|
| JP | 2002-367406 | 12/2002 |

OTHER PUBLICATIONS

Office Action issued in U.S. Appl. No. 13/040,779 dated Oct. 4, 2012.
European Search Report issued in EP Application No. 12176009.4 dated Aug. 21, 2012.
European Search Report issued in EP Application No. 11153747.8 dated May 20, 2011.
Office Action issued in U.S. Appl. No. 13/087,623 dated Nov. 23, 2011.

(Continued)

*Primary Examiner* — Stephen F Husar
*Assistant Examiner* — James Cranson, Jr.
(74) *Attorney, Agent, or Firm* — KED & Associates, LLP

(57) ABSTRACT

The lamp device may include: a plurality of light sources; a substrate including one side thereof on which a plurality of the light sources are disposed; a plurality of light guiders including both first ends coupled optically to a plurality of the light sources and second ends through which light is emitted; a frame including the second ends disposed thereon and controlling the direction of the light emitted from the second ends; and a body which is disposed on the substrate, a plurality of the light guiders and the frame.

20 Claims, 10 Drawing Sheets

OTHER PUBLICATIONS

Office Action issued in U.S. Appl. No. 13/040,779 dated Nov. 28, 2011.

U.S. Office Action issued in U.S. Appl. No. 13/040,779 dated May 29, 2012.

* cited by examiner

LAMP DEVICE

CROSS-REFERENCE TO RELATED APPLICATION(S)

This application is a continuation application of U.S. application Ser. No. 13/087,623 filed on Apr. 15, 2011 now U.S. Pat No. 8,297,790, and claims priority under 35 U.S.C. §119 to Korean Patent Application Nos. 10-2010-0079810 filed on Aug. 18, 2010 in Korea, 10-2010-0091546 filed on Sep. 17, 2010 in Korea, and 10-2010-0091861 filed on Sep. 17, 2010 in Korea, which are hereby incorporated by reference in their entirety.

BACKGROUND

1. Field

This relates to a lamp device.

2. Background

A light emitting diode (LED) may convert electric energy into light energy using relatively low power consumption, while providing relatively long life span, rapid response speed, and safety and also being environmentally friendly. LEDs may be used as a light source in various different types of lighting devices, such as, for example, liquid crystal display devices, electric signs, street lamps, pilot lamps, indoor lamps and other such devices.

SUMMARY

One embodiment is a lamp device. The lamp device includes: a plurality of light sources; a substrate including one side thereof on which a plurality of the light sources are disposed; a plurality of light guiders including both first ends coupled optically to a plurality of the light sources and second ends through which light is emitted; a frame including the second ends disposed thereon and controlling the direction of the light emitted from the second ends; and a body which is disposed on the substrate, a plurality of the light guiders and the frame.

Another embodiment is a lamp device. The lamp device includes: a first and a second light source which are spaced apart from each other by a first distance; a first light guider including both a first end coupled optically to the first light source and a second end through which light from the first light source is emitted; a second light guider including both a third end coupled optically to the second light source and a fourth end through which light from the second light source is emitted; and a frame in which the second end of the first light guider and the fourth end of the second light guider are disposed, and which controls the direction of the light emitted from the second end and the fourth end. A second distance between the second end and the fourth end is less than the first distance.

Further another embodiment is a lamp device. The lamp device includes: a substrate; a light source which is disposed on the substrate separately from the central axis of the substrate by a first distance; a light guider including both a first end coupled optically to the light source and a second end through which light from the light source is emitted and which is disposed separately from the central axis by a second distance; and a frame which is coupled to the second end of the light guider and controls the direction of the light emitted from the second end. The first distance is greater than the second distance.

BRIEF DESCRIPTION OF THE DRAWINGS

The embodiments will be described in detail with reference to the following drawings in which like reference numerals refer to like elements wherein.

DETAILED DESCRIPTION

Figure 1:
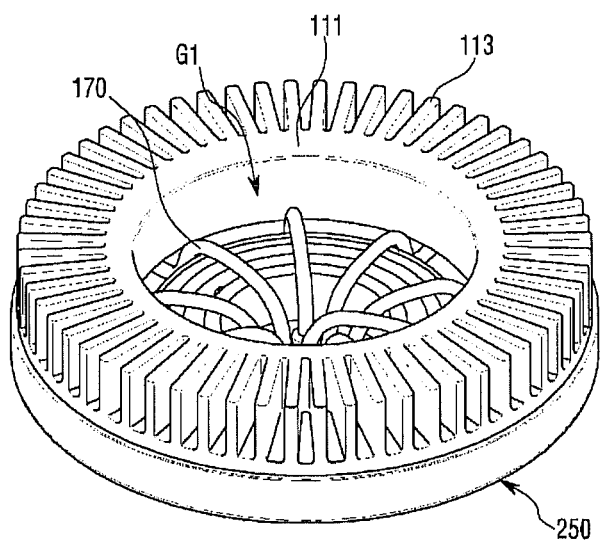
FIG. 1 is a perspective view of a lamp device in accordance with an embodiment as broadly described herein.

In the drawings, a thickness or size of each layer may be magnified, omitted or schematically shown, simply for purpose of convenience and clarity of description. The size of each component may not necessarily represent its actual size. Further, when an element is referred to as being 'on' or "under" another element, it may be directly on/under the element, or one or more intervening elements may also be present. When an element is referred to as being 'on' or 'under', 'under the element' as well as 'on the element' may be included based on the element.

Figure 2:
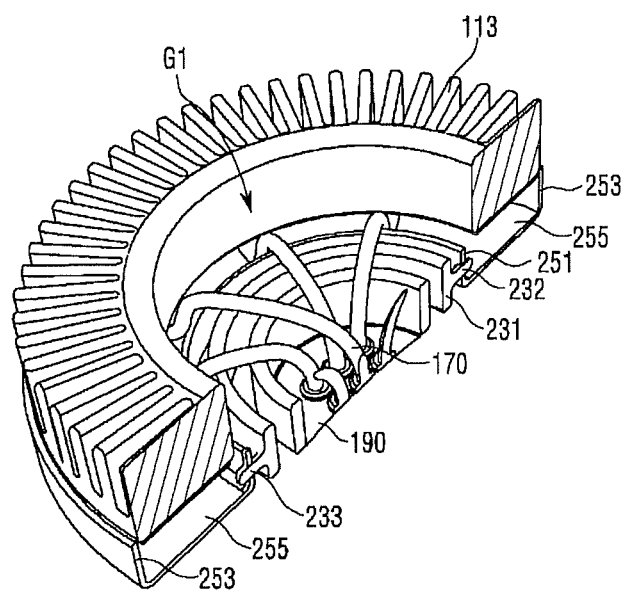
FIG. 2 is a sectional perspective view of the lamp device shown in FIG. 1.
Figure 3:
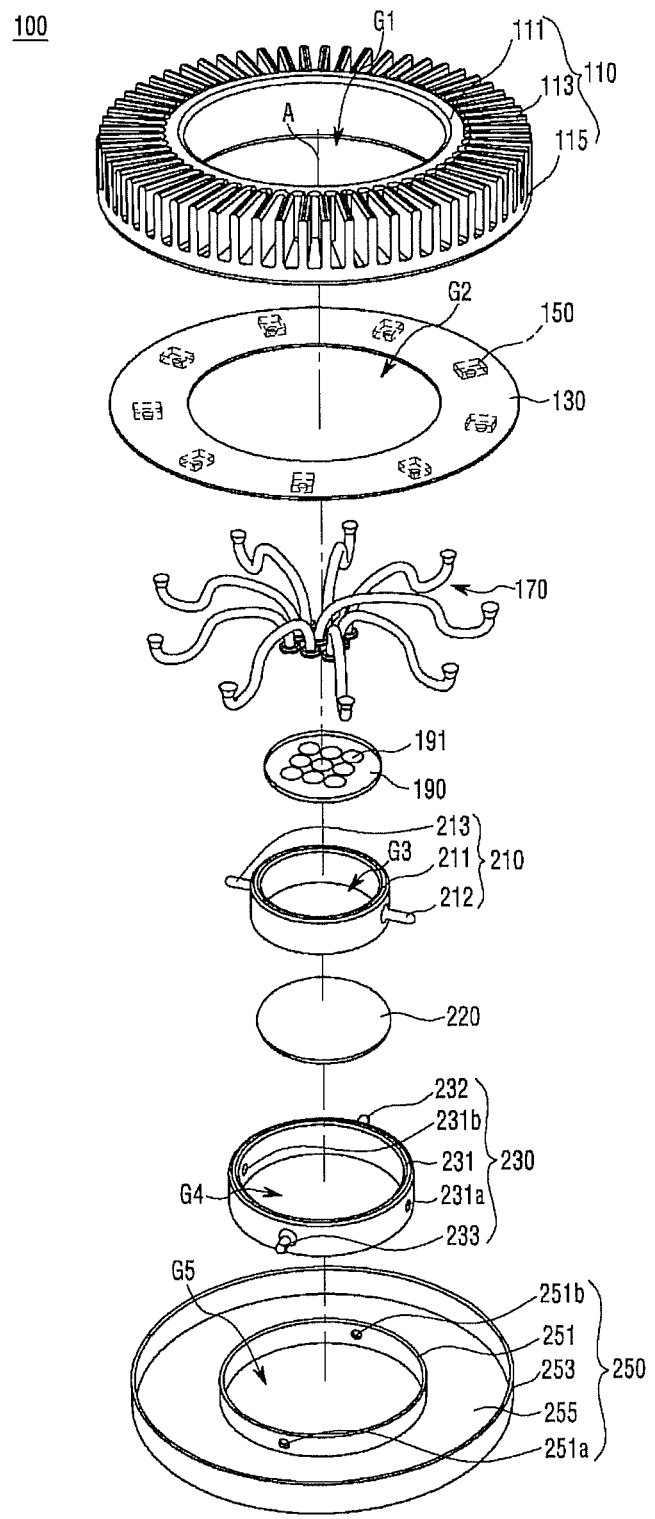
FIG. 3 is an exploded perspective view of the lamp device shown in FIG. 1.

Referring to FIGS. 1 to 3, a lamp device 100 as embodied and broadly described herein may include a heat radiator 110, or heat sink 110, a substrate 130, a light source 150, a light guide 170, a coupler 190, a first swivel frame 210, a condensing lens 220, a second swivel frame 230 and a receiving body 250. The heat radiator 110, or heat sink 110, may be made of a material, metal or non-metal, having sufficient thermal conductivity for heat exchange in a given application.

The heat sink 110 may include a ring 111, a plurality of fins 113 and a base 115, so that, in this embodiment, the heat sink 110 has an annular shape. However, the shape of the heat sink 110 may have, for example, a polygonal shape or other various shapes as appropriate.

The ring 111 may have an inner surface and an outer surface such that an opening G1 having a central axis "A" is formed in the center of the ring 111. The plurality of fins 113 may be joined to the outer surface of the ring 111 and extend radially outward from the outer surface of the ring 111. The plurality of fins 113 may be separated from each other at a regular interval such that heat generated by the light source 150 may be uniformly radiated/dissipated/transferred to the outside. The base 115 may be joined to one outer end of the ring 111 and extend substantially perpendicular to the outer surface of the ring 111. The base 115 may be joined to one end of the plurality of fins 113 which are joined to the outer surface of the ring 111. A plurality of fins 113 are shown in this embodiment. However, other structures that serve to increase heat absorption/dissipation area may also be appropriate.

The substrate 130 may include a top surface and a bottom surface. The top surface may be positioned adjacent to the base 115 of the heat sink 110. The light source 150 may be provided on the bottom surface of the substrate 130. The substrate 130 may be, for example, a metal printed circuit board (PCB) or another type of substrate capable of accommodating such a light source.

The substrate 130 may have a disk shape corresponding to the ring 111 having the opening G1. The substrate 130 may have an opening G2 in the center thereof so that heat generated by the light source 150 may be radiated to the outside through the circulation of air. The opening G2 at the center of the substrate 130 may correspond to the opening G1 of the heat sink 110.

The light source 150 may include a plurality of light emitting diodes (LEDs), which may be radially disposed on the bottom surface of the substrate 130. That is, the plurality of LEDs may be arranged on the bottom surface of the substrate 130 similar to the arrangement of the plurality of fins 113.

When such a plurality of LEDs are radially disposed on the substrate 130, heat generated due to operation of the LEDs may be dissipated more efficiently. The heat from the LEDs may be radiated through the base 115 of the heat sink 110 and the top surface of the substrate 130 and through the plurality of fins 113 of the heat sink 110. As a result, a heat radiating surface area may be increased so that heat transfer characteristics may be improved. In alternative embodiments, a conductive sheet for radiating heat may be provided between the substrate 130 and the base 115 of the heat sink 110, so that heat transfer characteristics between the substrate 130 and the heat sink 110 may be further improved.

Since in this embodiment the plurality of LEDs are mounted on one substrate rather than individual/separate substrates, repair and maintenance of the substrate 130 including the light source 150 may be facilitated.

The light guide 170 may include a plurality of optical fibers. One end of each optical fiber may be optically connected to one of the plurality of LEDs 150. In the embodiment shown in FIGS. 1-3, the optical fiber is shown as an exemplary embodiment the light guide 170. However, other devices, such as, for example, a prism of an optical device capable of changing the direction of light generated by a light source into a desired direction may be used as the light guide 170.

The coupler 190 may include a plurality of holes 191, which in this embodiment is essentially a plate that receives and binds the ends of the plurality of optical fibers, and may, in certain embodiments, have a shape of a disk. Therefore, the plurality of LEDs may bound by the coupler 190, or plate 190, so that a wide emission area of light generated by the plurality of radially disposed LEDs becomes smaller and light may be collected in a particular direction. As noted above, in this embodiment, the coupler 190 is shown as a plate 190 to which the ends of the light guide 170 are coupled or bound, so as to concentrate the light emitted by the light source 150 at the plate 190, or coupler 190.

The ends of the optical fibers inserted into the holes 191 of the coupler 190 may be aligned such that the ends are positioned on essentially the same plane. This may provide for uniform intensity of light at a particular plane on which the light is incident.

The coupler 190 may be seated in an opening G3 of the first swivel canister 210, so that the coupler 190 has an optical orientation plane determined based on an adjustment of the angle of the first swivel canister 210. That is, the coupler 190, which forms the light radiation surface, may be inclined with respect to one side of the substrate 130 by the first swivel canister 210.

Figure 4:
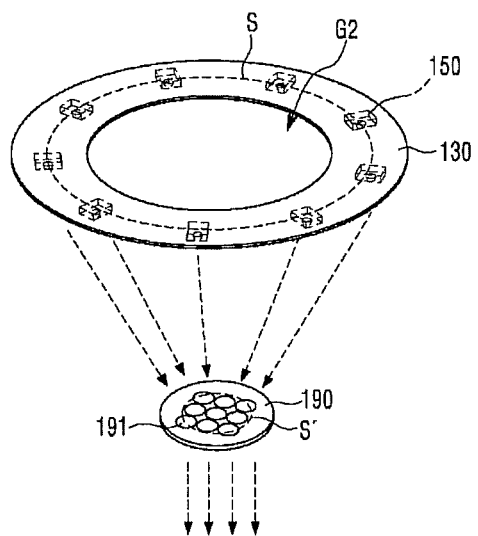
FIG. 4 illustrates a light radiation surface and a light emitting surface of the lamp device shown in FIG. 1.

As shown in FIG. 4, an area "S'" of the light radiation surface of the light guide 170 is less than an area "S" of the light emitting surface of the plurality of LEDs through the coupler 190. That is, the light emitted from the light source 150 may be condensed at the light radiation surface defined by the coupler 190.

The light emitting surface "S" and the light radiation surface "S'" may have the same central axis "A". Therefore, when the area "S'" of the light radiation surface and the area "S" of the light emitting surface are formed are formed about the same central axis "A" of the opening G1 of the heat sink 110 and the opening G2 of the substrate 130, the area "S'" of the light radiation surface may be encompassed by the area "S" of the light emitting surface.

In this embodiment, the first swivel frame 210 may include a first projection 212, a second projection 213 and a first ring 211 having an inner surface and an outer surface such that a circular opening G3 having a central axis is formed in the center of the first ring 211. The first projection 212 and the second projection 213 may be formed on the outer surface of the first ring 211, opposite each other. The first projection 212 and the second projection 213 may extend outward from the outer surface of the first ring 211. The first projection 212 and the second projection 213 of the first swivel frame 210 may be respectively inserted into a first hole 231a and a second hole 231b of the second swivel frame 230. Accordingly, the first swivel frame 210 may be joined and fitted to the second swivel frame 230.

The first swivel frame 210 may be inclined at an angle to rotate about the first projection 212 and the second projection 213. Therefore, light generated from the light source 150 may be directed in a direction selected by a user by adjustment of the angle of the first swivel frame 210.

The condensing lens 220 may be optically joined to the first swivel frame 210 and cover opening in the swivel frame 210 that is opposite an opening therein in which the coupler 190 is seated. Such a condensing lens 220 may more optically condense the light which has been physically condensed by the coupler 190.

Like the first swivel frame 210, the second swivel frame 230 may include a first projection 232, a second projection 233 and a second ring 231 having an inner surface and an outer surface such that a circular opening G4 having a central axis is formed in the center of the second ring 231. The first hole 231a and the second hole 231b penetrate through the structure of the second ring 231 and face each other. The first and the second projections 232 and 233 extend outward from the outer surface of the second ring 231.

In such a second swivel frame 230 and first swivel frame 210 coupled thereto, a first imaginary line extending from the first projection 232 to the second projection 233 may be at a right angle to a second imaginary line extending from the central axis of the first hole 231a to the central axis of the second hole 231b.

Therefore, light radiated from the light guide 170 may be controlled within a first angle range by the first swivel frame 210. This controlled light may be further controlled within a second angle range by the second swivel frame 230. In certain embodiments, the first angle may be perpendicular to the second angle.

The circumference of the inner surface of the second swivel frame 230 may be greater than that of the outer surface of the first swivel frame 210, so that the first swivel frame 210 may be inserted into the second swivel frame 230.

The receiving body 250 may include an inner circumferential wall 251 such that a circular opening G5 is formed, an outer circumferential wall 253 formed radially outward from the inner circumferential wall 251 at a regular interval from the inner circumferential wall 251, and base wall 255 extending from an end of the inner circumferential wall 251 to a corresponding end of the outer circumferential wall 253.

The inner circumferential wall 251 may include mutually facing first and second holes 251a and 251b into which the first projection 232 and the second projection 233 of the second swivel frame 230 may be respectively inserted. The second swivel frame 230 may be joined and fitted to an inner surface of the inner circumferential wall 251 of the receiving body 250. The outer circumferential wall 253 of the receiving body 250 may surround the light source 150 and the light guide 170.

Since the lamp device 100 described above includes a heat radiator 110, or heat sink 110, having a structure in which heat generated from LEDs of a light source 150 may be radiated spatially, not in an up-and-down direction, but outward, in a horizontal direction via the fins 113 and base 115 when the lamp device 100 is operated, an overall volume of the lamp device 100 may be substantially reduced. Accordingly, a lamp device including a heat radiator, or heat sink, as embodied and broadly described herein may have fewer spatial limitations and greater installation flexibility.

Figure 5A:
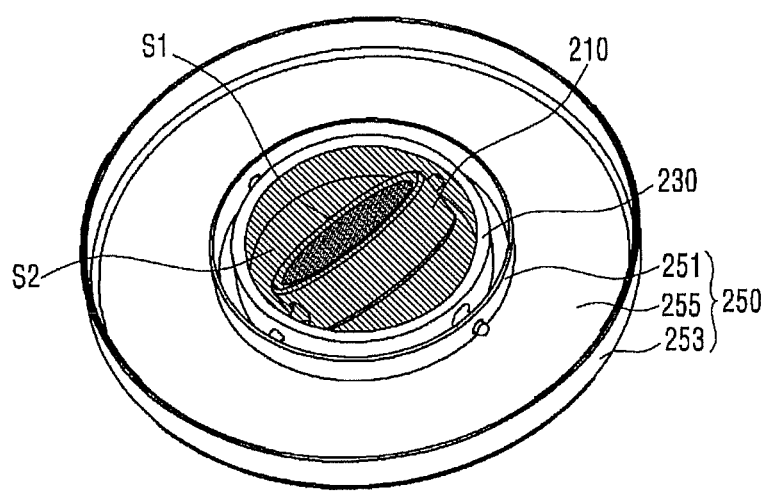
FIGS. 5a to 5c illustrate operation of a first swivel frame and a second swivel frame of the lamp device shown in FIG. 1.
Figure 5B:
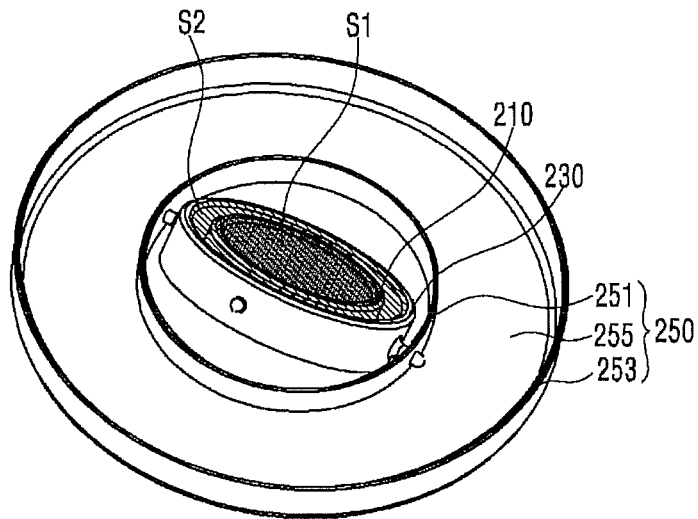
Figure 5C:
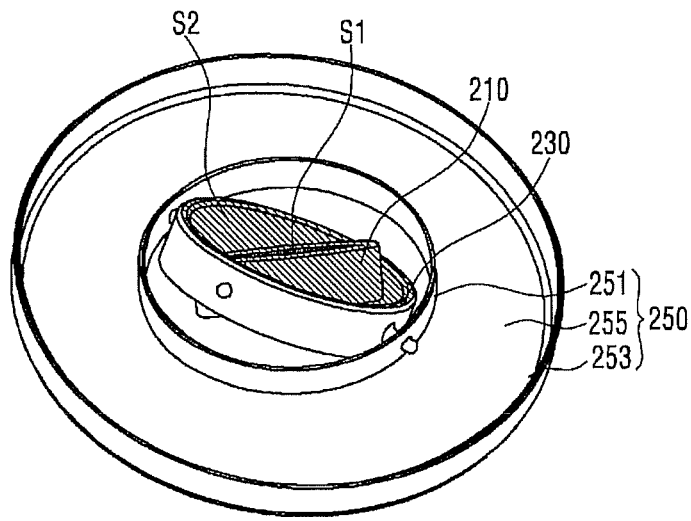

FIGS. 5a to 5c illustrate operation of the first and second swivel frames 210 and 230 during operation of the lamp device 100 shown in FIGS. 1-3.

In one exemplary orientation, as shown in FIG. 5a, an opening surface "S2" of the second swivel frame 230 may be parallel with the base wall 255 of the receiving body 250. An opening surface "S1" of the first swivel frame 210 may be inclined with respect to the bottom 255 of the receiving body 250. The bottom wall 255 of the receiving body 250 may be parallel with the substrate 130 shown in FIG. 3.

In another exemplary embodiment, as shown in FIG. 5b, the opening surface "S2" of the second swivel frame 230 may be inclined in one direction with respect to the bottom wall 255 of the receiving body 250. The opening surface "S1" of the first swivel frame 210 and the opening surface "S2" of the second swivel frame 230 may be located on the same plane. That is, the opening surface "S1" of the first swivel frame 210 and the opening surface "S2" of the second swivel frame 230 may be inclined in the same direction. The bottom wall 255 of the receiving body 250 may be parallel with the substrate 130 shown in FIG. 3.

In another exemplary orientation shown in FIG. 5c, the opening surface "S1" of the first swivel frame 210 may be inclined in one direction with respect to the bottom wall 255 of the receiving body 250. The opening surface "S2" of the second swivel frame 230 may be inclined in another direction with respect to the bottom wall 255 of the receiving body 250. In this orientation, an axis around which the opening "S1" of the first swivel frame 210 is inclined in one direction is perpendicular to an axis around which the opening surface "S2" of the second swivel frame 230 is inclined in another direction.

Figure 6:
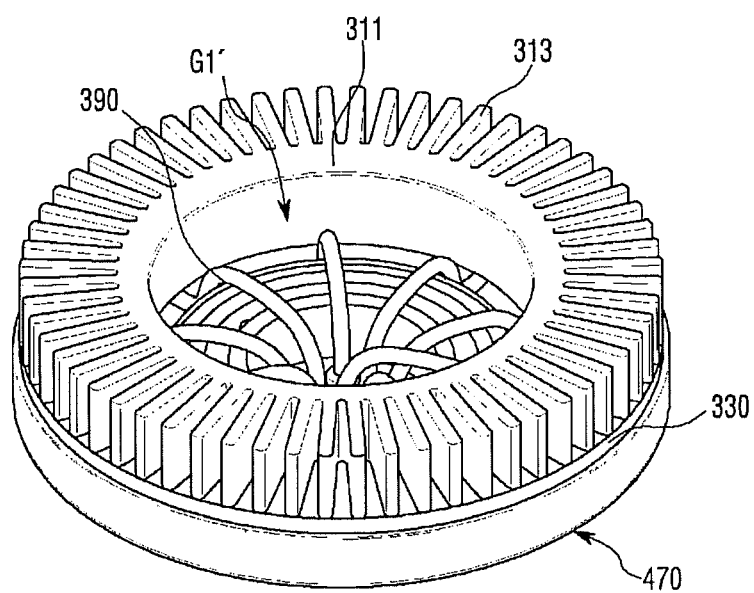
FIG. 6 is a perspective view of a lamp device in accordance with another embodiment as broadly described herein.
Figure 7:
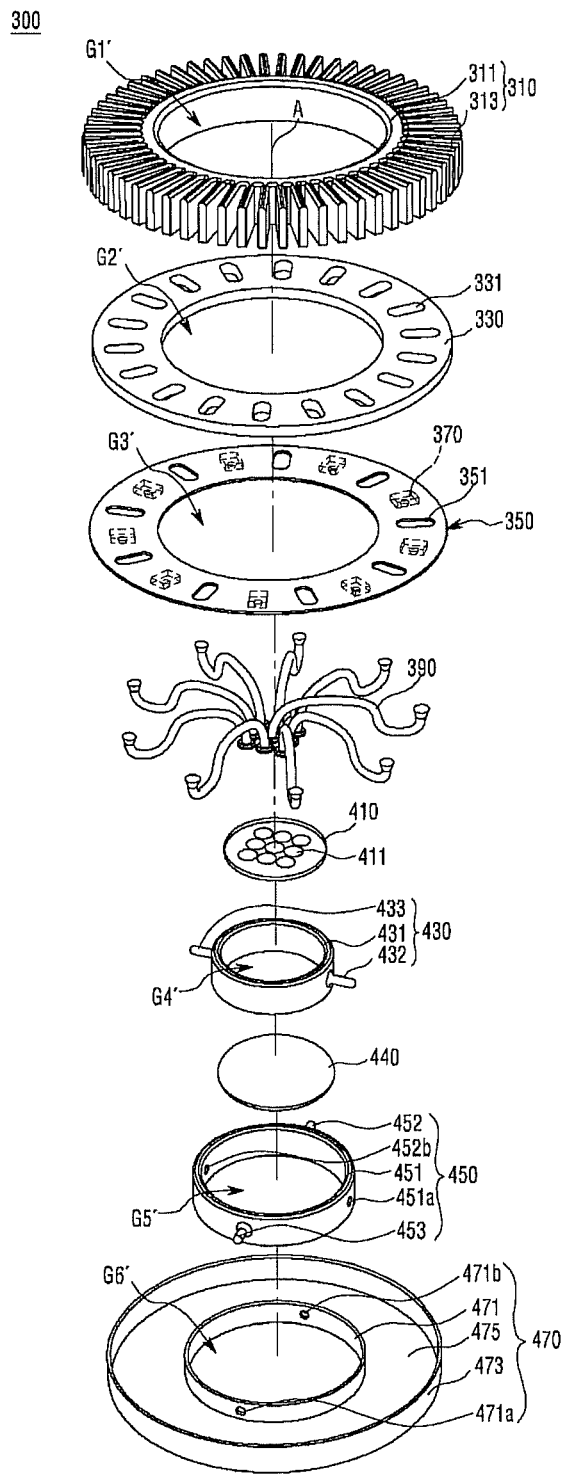
FIG. 7 is an exploded perspective view of the lamp device shown in FIG. 6.

As shown in FIGS. 6 and 7, a lamp device 300 in accordance with another embodiment as broadly described herein may include a heat radiator 310, or heat sink 310, a heat radiating plate 330, a substrate 350, a light source 370, a light guide 390, a coupler 410 having holes 411 formed therein, a first swivel frame 430, a condensing lens 440, a second swivel frame 450 and a receiving body 470.

The heat sink 310 may include a ring 311 and a plurality of fins 313, so that the radiating sink body 310 has an annular shape. The ring 311 may have an inner surface and an outer surface such that an opening G1' having a central axis "A" is formed in the center of the ring 311. The plurality of fins 313 may be joined to the outer surface of the ring 311 and extend radially outward from the outer surface of the ring 311. The plurality of fins 313 may be separated from each other at a regular interval such that heat generated by the light source 370 may be uniformly radiated to the outside. That is, two adjacent fins 313 may be spaced apart from each other at a regular interval.

The heat radiating plate 330 may include holes 331 corresponding to the intervals between the adjacent fins 313. The heat radiating plate 330 may also include a central opening G2' corresponding to the central opening G1' of the heat sink 310. The holes 331 in the heat radiating plate 330 may have an elongated oval or rectangular shape which is substantially parallel with the longitudinal extending direction of the fins to allow external air to more easily flow from the top of the heat sink 310. When the substrate 350 directly contacts the plurality of the fins 313, the heat radiating plate 330 may be omitted.

The substrate 350 may include a top surface that is adjacent to the heat radiating plate 330 and a bottom surface on which light source 370 is arranged. A metal printed circuit board (PCB), or other substrate capable of including such a light source may be used as the substrate 350.

The substrate 350 may have a disk shape having an opening G3' in the center thereof corresponding to the opening G2' in the heat radiating plate 330 so that heat generated from the light source 370 may be radiated to the outside through the circulation of external air. Additionally, the substrate 350 may include a plurality of holes 351 formed between adjacent light sources 370 arranged on the bottom surface of the substrate 350.

In certain embodiments, the holes 351 of the substrate 350 are disposed between the light sources 370 and correspond to the holes 331 of the heat radiating plate 330. Like the holes 331 of the heat radiating plate 330, the holes 351 of the substrate 350 may have an elongated oval or rectangular shape.

In certain embodiments, the substrate 350 may transfer heat into the plurality of fins 313 of the heat sink 310 without the heat radiating plate 330. Further, heat transfer characteristics between the heat sink 310 and the heat radiating plate 330, or between the heat radiating plate 330 and the substrate 350, by adding conductive sheet(s) between the heat sink 310 and the heat radiating plate 330 or between the heat radiating plate 330 and the substrate 350.

The light source 370 may include a plurality of light emitting diodes (LEDs) that are radially arranged on the bottom surface of the substrate 350, as the plurality of fins 313 of the heat sink 310 are disposed. When so arranged, the radiation/heat transfer/dissipation area of heat generated due to operation of the LEDs may increase, and heat release efficiency may be improved. The heat from the LEDs may be radiated by the circulation of air through the holes 351 and 331 either the substrate 350 or the heat radiating plate 330. The plurality of fins 313 of the heat sink 310 may increase the heat radiation surface area, so that heat transfer characteristics may be improved. In certain embodiments, a conductive sheet for radiating heat may be provided between the substrate 350 and the heat radiating plate 330, so that heat transfer characteristics between the substrate 350 and the heat radiating plate 330 may be further improved.

Since in this embodiment the plurality of LEDs are arranged on one substrate instead of separate substrates, if necessary, repair and maintenance of the substrate including the light source may be facilitated.

Similar to the corresponding components of the embodiment shown in FIGS. 1-3, the first swivel frame 430 shown in FIG. 7 may include a ring 431 that defines an opening G4' and first and second projections 432 and 433; the second swivel frame 450 shown in FIG. 7 may include a ring 451 that defines an opening G5', first and second holes 451a and 451b and first and second projections 452 and 453; and the receiving body 470 shown in FIG. 7 may include an inner wall 471 that defines an opening G6', an outer wall 473, a base wall 475, and first and second holes 471a and 471b. The light guide 390, the coupler 410, the first swivel frame 430, the condensing lens 440, the second swivel frame 450 and the receiving body 470 shown in FIG. 7 are similar to the corresponding components of the embodiment shown in FIG. 3, and thus further detailed description thereof will not be repeated.

Figure 8:
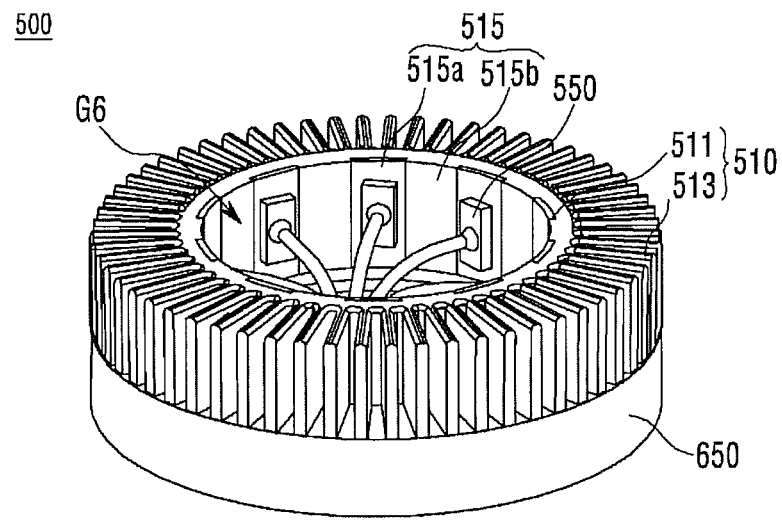
FIG. 8 is a perspective view of another lamp device in accordance with another embodiment as broadly described herein.
Figure 9:
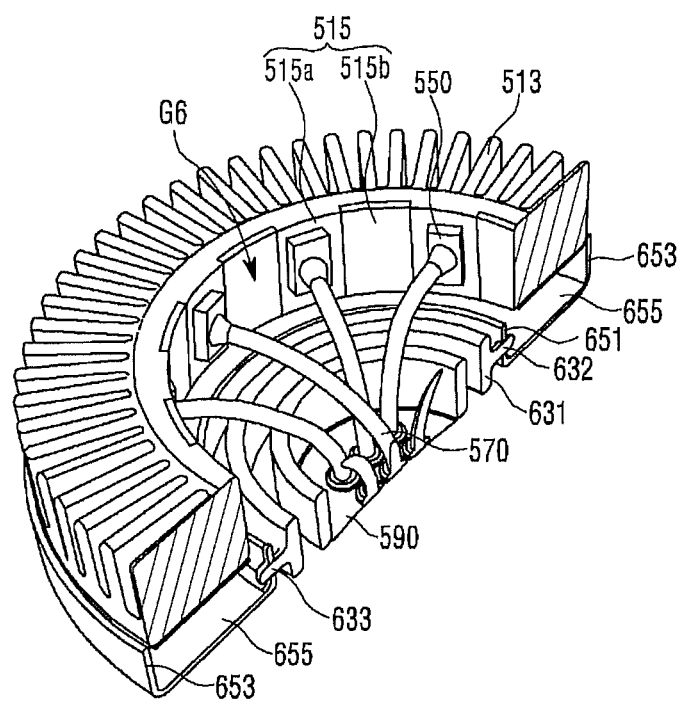
FIG. 9 is a cross sectional view of the lamp device shown in FIG. 8.
Figure 10:
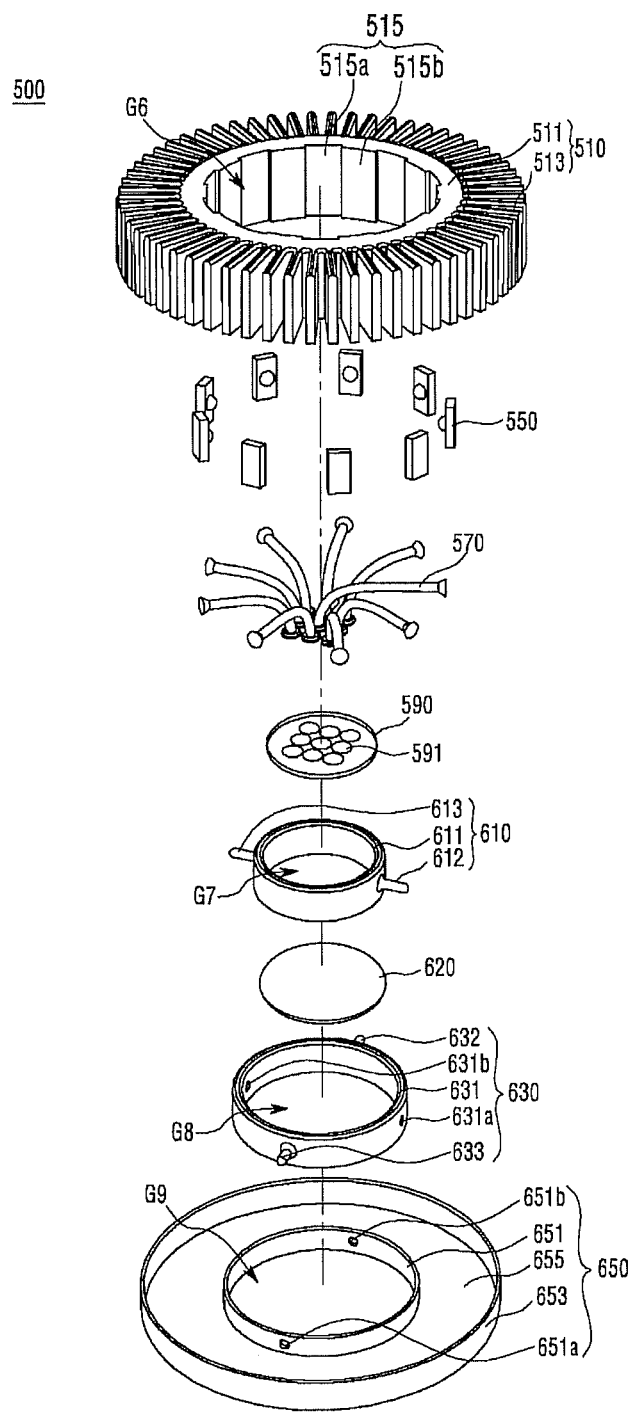
FIG. 10 is an exploded perspective view of the lamp device shown in FIG. 8.

As shown in to FIGS. 8 to 10, a lamp device 500 in accordance with another embodiment as broadly described herein may include a heat radiator 510, or heat sink 510, a light source 550, a light guide 570, a coupler 590 having holes 591 formed therein, a first swivel frame 610, a condensing lens 620, a second swivel frame 630 and a receiving body 650.

The heat sink 510 may include a ring 511 and a plurality of fins 513, so that the heat sink 510 has an annular shape. The ring 511 may have an inner surface and an outer surface such that an opening G6 having a central axis is formed in the center of the ring 511. The plurality of fins 513 may be joined to the outer surface of the ring 511 and extend radially outward from the outer surface of the ring 511. The plurality of fins 513 may be separated from each other at a regular interval such that heat generated from the light source 550 may be uniformly radiated/dissipated/transferred to the outside.

The inner surface of the ring may 511 include a plurality of flat portions 515, including a plurality of insertion portions 515a and a plurality of projections 515b. The light source 550, such as, for example, an LED may be seated on each of the plurality of insertion portions 515a. The plurality of projections 515b may guide the fixing and supporting of the light source 550 on the respective insertion portion 515a. The plurality of flat portions 515 may include at least two flat portions which are parallel with each other and facing each other, so that a plurality of light sources 550 may be symmetrically arranged on the inner surface of the ring structure.

That is, the plurality of light sources 550 may be radially arranged on the inner surface of the ring 511 relative to the opening G1. While the plurality of light sources 550 may include LEDs, other light emitting devices capable of emitting light may also be employed.

As such, the light source 550 may be arranged along the inner surface of the annular heat sink 510 so that when the lamp device 500 is operated, heat generated by the light source 550 is radially radiated and heat release efficiency is improved.

In certain embodiments, a conductive sheet for radiating heat may be provided between the inner surface of the heat sink 510 and the light source 550, so that heat transfer characteristics between the heat sink 510 and the light source 550 may be further improved.

The light guide 570 may include a plurality of optical fibers. One end of each optical fiber may be optically connected to the plurality of LEDs, i.e., the light source 550. Other devices capable of changing the direction of light generated by the light source 550 into a desired direction may be used as the light guide 570.

The coupler 590 in this embodiment may essentially be a plate including a plurality of holes 591 for receiving and binding the ends of the plurality of optical fibers, and may have a disk shape. The plurality of holes 591 may be concentrated at the center of the coupler 590 so that the plurality of LEDs are bound by the flange 590, and a wide emission area of light generated by the radially arranged LEDs becomes smaller and light is collected in a particular direction. Consequently, the coupler 590 may cause the radiation area of light generated by the light guide 570 to be less than the emitting area of light generated by the plurality of LEDs on the inner surface of the heat sink 510, thereby causing the light to be condensed.

The ends of the optical fibers inserted into the holes 591 of the flange 590 may be arranged such that the ends are placed on the same plane to obtain uniform intensity of light at a particular plane on which the light is incident. The coupler 590 seated in an opening G7 of the first swivel canister 610, so that the coupler 590 has an optical orientation plane based on the adjustment of the angle of the first swivel canister 610. Similar to the corresponding components of the embodiment shown in FIGS. 1-3, the first swivel frame 610 shown in FIG. 10 may include a ring 611 that defines an opening G7 and first and second projections 612 and 613; the second swivel frame 630 shown in FIG. 10 may include a ring 631 that defines an opening G8, first and second holes 631a and 631b and first and second projections 632 and 633; and the receiving body 650 shown in FIG. 10 may include an inner wall 651 that defines an opening G8, an outer wall 653, a base wall 655, and first and second holes 651a and 651b. Since the first swivel frame 610, the condensing lens 620, the second swivel frame 630 and the receiving body 650 shown in FIG. 10 are similar to the corresponding components of the embodiment shown in FIG. 3, further detailed description thereof will not be repeated.

Since the lamp device 500 described above includes a heat radiator, or heat sink having a structure in which heat generated by the light emitting diodes may be radiated spatially, not in an up-and-down direction, but outward, in a horizontal direction via the fins when the lamp device 500 is operated, an overall volume of the lamp device 500 may be substantially reduced. Accordingly, a lamp device including a heat radiator or heat sink as embodied and broadly described herein may have fewer spatial limitations and more versatile installation options.

Moreover, light may be condensed by the light guide instead of various other optical means typically employed for condensing light, so the structure of the lamp device may be substantially simplified and manufacturing cost thereof may be reduced.

Figure 11:
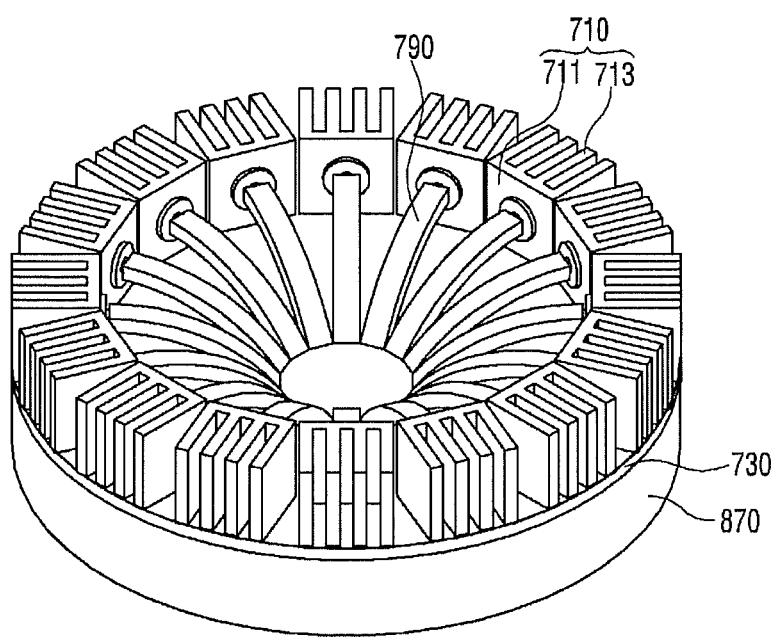
FIG. 11 is a perspective view of a lamp device in accordance with another embodiment as broadly described herein.
Figure 12:
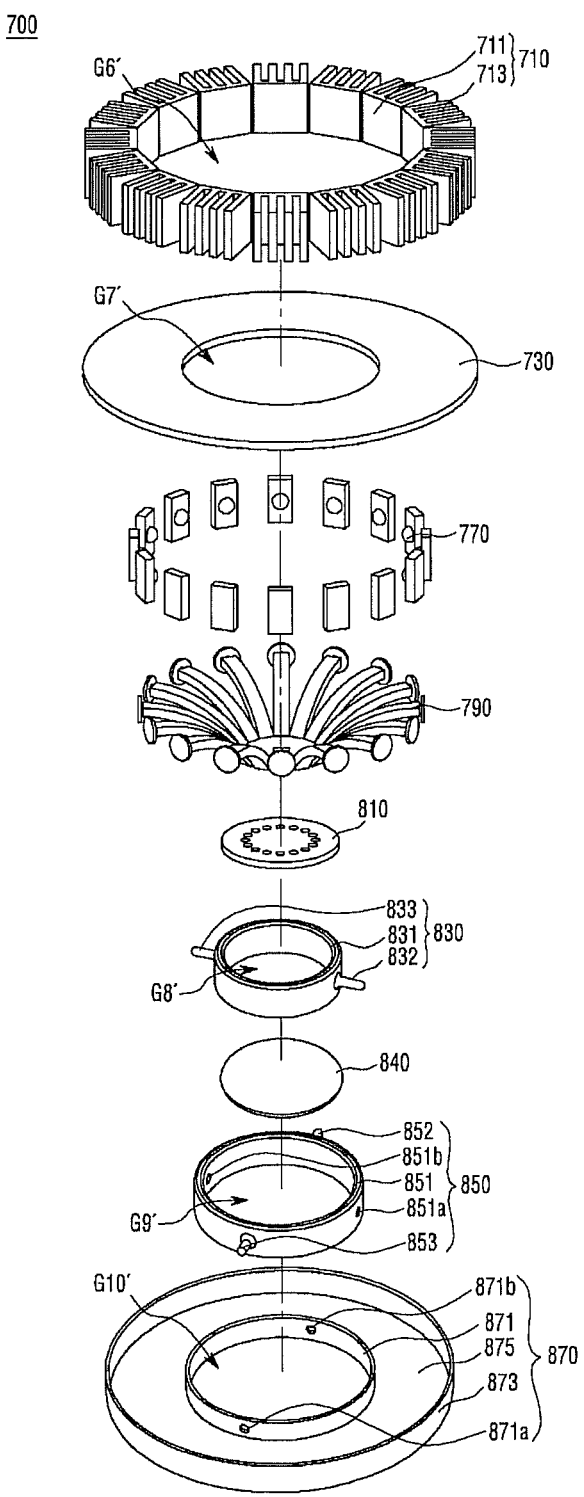
FIG. 12 is an exploded perspective view of the lamp device shown in FIG. 11.

As shown in FIGS. 11 and 12, a lamp device 700 in accordance with another embodiment as broadly described herein may include a heat radiator 710, or heat sink 710, a base 730, a light source 770, a light guide 790, a coupler 810, a first swivel frame 830, a condensing lens 840, a second swivel frame 850 and a receiving body 870.

The heat sink 710 may include a plurality of heat sinks 710 each including a flat portion 711 and a plurality of fins 713 extending from one side of the flat portion. The plurality of heat 710 may be arranged radially on a flat surface of the base 730. An opening G6' may be formed by the arrangement of the plurality of heat sinks 710.

The base 730 may have a disk shape with an opening G7' formed at the center thereof. The base 730 may include a conductive material such that heat transferred from the heat sink 710 is radiated to the outside.

The light source 770 may include a plurality of LEDs respectively provided on the flat portions 711 of the plurality of heat sink 710. Such arrangement may allow heat generated by the light source 770 to be radially radiated, so that heat radiation efficiency may be increased.

In certain embodiments, a conductive sheet for radiating heat may be provided between the flat portion 711 of the heat radiating body 710 and the light source 730, so that heat transfer characteristics between the heat sink 710 and the light source 730 may be further improved.

The light guide 790 may include a plurality of optical fibers. One end of the optical fibers may be optically connected to the plurality of light emitting diodes. Other devices capable of changing the direction of light generated by the light source 770 into a desired direction may be used as the light guide 790.

Similar to the corresponding components of the embodiment shown in FIGS. 1-3, the first swivel frame 830 shown in FIG. 12 may include a ring 831 that defines an opening G8' and first and second projections 832 and 833; the second swivel frame 850 shown in FIG. 12 may include a ring 851 that defines an opening G9', first and second holes 851a and 851b and first and second projections 852 and 853; and the receiving body 870 shown in FIG. 12 may include an inner wall 871 that defines an opening G10', an outer wall 873, a base wall 875, and first and second holes 871a and 871b. The coupler 810, the first swivel frame 830, the condensing lens 840, the second swivel frame 850 and the receiving body 870 shown in FIG. 12 are similar to the corresponding components of the embodiment shown in FIG. 3, and thus further detailed description thereof will not be repeated.

In the exemplary embodiments described above, the heat radiator, or heat sink, is substantially annular, with curricular openings of the various components aligned so as to accommodate the light guide. However, the heat radiator/heat sink may have other shapes, and the openings formed by the various components may be either central or offset, and may have various other shapes, depending on the particular configuration of the associated lighting device and installation thereof.

A lamp device as embodied and broadly described herein may include a substrate, a light emitting device disposed on one side of the substrate, a light guider having one end thereof optically connected to the light emitting device and guiding light emitted from the light emitting device, and a flange binding the other end of the light guider, and a heat radiator thermally connected to the other side of the substrate in order to radiate heat generated from the light emitting device.

A lamp device in accordance with another embodiment in accordance with another embodiment as broadly described herein may include a plurality of light emitting devices disposed on one side of a substrate, a plurality of light guiders of which one ends are optically connected to a plurality of the light emitting devices, and a radiation surface formed by a plurality of the light guiders is inclined at an angle less than 180°.

A lamp device in accordance with another embodiment as broadly described herein may include a structure having an inner surface forming an opening, a substrate disposed on the structure, a plurality of light emitting devices disposed on the structure, a light guider having a plurality of optical paths coupled optically to a plurality of the light emitting devices, and a flange binding the other ends of a plurality of the light guiders.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lamp device, comprising:
a plurality of light sources;
a substrate including one side thereof on which a plurality of the light sources are disposed;
a plurality of light guiders including both first ends coupled optically to a plurality of the light sources and second ends through which light is emitted;
a frame including the second ends disposed thereon and controlling the direction of the light emitted from the second ends; and
a body which is disposed on the substrate, a plurality of the light guiders and the frame.

2. The lamp device of claim 1, wherein the body further has a recess in which a plurality of the light sources and a plurality of the light guiders are disposed.

3. The lamp device of claim 2, wherein the frame is rotatable around a predetermined axis and comprises a projection disposed on the axis, wherein the body comprises an inner wall defining an opening in which the frame is disposed, and wherein the inner wall comprises a hole into which the projection of the frame is inserted.

4. The lamp device of claim 2, wherein the frame comprises a first frame rotatable around a first axis and a second frame rotatable around a second axis, wherein the body comprises an opening, wherein the first frame is disposed in the second frame, wherein the second frame is disposed in the opening of the body, and wherein the first axis is perpendicular to the second axis.

5. The lamp device of claim 4, wherein the first frame comprises a first and a second projection disposed on the first axis, wherein the second frame comprises a third and a fourth projection disposed on the second axis, wherein the second frame comprises a first and a second hole corresponding to the first and the second projections, and wherein the body comprises a third and a fourth hole corresponding to the third and the fourth projections.

6. The lamp device of claim 2, further comprising a heat sink disposed on the other side of the substrate.

7. The lamp device of claim 1, further comprising a flange which binds the second ends and is disposed in the frame.

8. The lamp device of claim 7, further comprising a lens which is disposed on the second ends and is disposed in the frame.

9. The lamp device of claim 7, wherein the flange comprises a plurality of central holes and wherein the second ends are disposed in a plurality of the holes of the flange.

10. A lamp device comprising:
- a first and a second light source which are spaced apart from each other by a first distance;
- a first light guider including both a first end coupled optically to the first light source and a second end through which light from the first light source is emitted;
- a second light guider including both a third end coupled optically to the second light source and a fourth end through which light from the second light source is emitted; and
- a frame in which the second end of the first light guider and the fourth end of the second light guider are disposed, and which controls the direction of the light emitted from the second end and the fourth end, wherein a second distance between the second end and the fourth end is less than the first distance.

11. The lamp device of claim 10, further comprising:
- a substrate including one side thereof on which the first and the second light sources are disposed; and
- a body in which the substrate, the first and the second light guiders and the frame are disposed, and which has a recess.

12. The lamp device of claim 11, wherein the frame comprises a first frame rotatable around a first axis and a second frame rotatable around a second axis, wherein the body comprises an opening, wherein the first frame is disposed in the second frame, wherein the second frame is disposed in the opening of the body, and wherein the first axis is perpendicular to the second axis.

13. The lamp device of claim 12, wherein the first frame comprises a first and a second projection disposed on the first axis, wherein the second frame comprises a third and a fourth projection disposed on the second axis, wherein the second frame comprises a first and a second hole corresponding to the first and the second projections, and wherein the body comprises a third and a fourth hole corresponding to the third and the fourth projections.

14. The lamp device of claim 10, further comprising a flange which binds the second and the fourth ends and is disposed in the frame.

15. The lamp device of claim 14, further comprising a lens which is disposed in the frame and collects light emitted from the second and the fourth ends.

16. The lamp device of claim 14, wherein the flange comprises a first central hole and a second central hole and wherein the second and the fourth ends are disposed in the first and the second holes of the flange.

17. A lamp device comprising:
- a substrate;
- a light source which is disposed on the substrate separately from the central axis of the substrate by a first distance;
- a light guider including both a first end coupled optically to the light source and a second end through which light from the light source is emitted and which is disposed separately from the central axis by a second distance; and
- a frame which is coupled to the second end of the light guider and controls the direction of the light emitted from the second end, wherein the first distance is greater than the second distance.

18. The lamp device of claim 17, wherein the substrate comprises one side and the other side, and wherein a plurality of the light sources are radially disposed on the one side of the substrate, and further comprising: a heat sink disposed on the other side of the substrate; and a body which is coupled to the heat sink and in which the substrate and the light guider are disposed.

19. The lamp device of claim 18, wherein the body comprises an opening in which the frame is disposed, wherein the frame comprises a first frame in which the second end of the light guider is disposed and a second frame surrounding the first frame, and wherein an axis of rotation of the first frame is different from an axis of rotation of the second frame.

20. The lamp device of claim 18, further comprising a flange which includes a hole into which the second end of the light guider is inserted and which is coupled to the frame.

* * * * *